United States Patent [19]
Broddon et al.

[11] Patent Number: 5,791,669
[45] Date of Patent: Aug. 11, 1998

[54] SHOPPING CART CADDY

[76] Inventors: James L. Broddon, 383 Copper Lakes Blvd., Wildwood, Mo. 63040; Lawrence Glass, 10380 Sannois, Apartment 5, St. Louis, Mo. 63146; Herman Avren, P.O. Box 8453, St. Louis, Mo. 63132

[21] Appl. No.: 786,744

[22] Filed: Jan. 24, 1997

[51] Int. Cl.⁶ ................................................. B62B 3/04
[52] U.S. Cl. ................................. 280/47.34; 280/33.992
[58] Field of Search ........................... 414/798.4, 490; 280/33.991, 33.992, 33.995, 47.34, 47.35, 79.3, DIG. 4

[56] References Cited

U.S. PATENT DOCUMENTS

| | | |
|---|---|---|
| 1,717,384 | 6/1929 | Johnson . |
| 3,001,763 | 9/1961 | Pilot ............................ 254/139.1 |
| 3,061,049 | 10/1962 | Bramley ......................... 188/21 |
| 5,082,074 | 1/1992 | Fischer ........................... 180/11 |
| 5,325,938 | 7/1994 | King ............................... 188/19 |

FOREIGN PATENT DOCUMENTS

| | | |
|---|---|---|
| 203834 | 12/1986 | European Pat. Off. . |
| 2232386 | 12/1990 | United Kingdom . |
| 90/1192 | 10/1990 | WIPO . |

Primary Examiner—Richard M. Camby
Attorney, Agent, or Firm—Armstrong, Teasdale, Schlafly & Davis

[57] ABSTRACT

A wheeled caddy for transporting a row of nested shopping carts. The caddy includes a cage for receiving the front end of the first shopping cart in the row. A tether extends from the caddy and adapted to be attached to the last cart in the row. The caddy has a normally engaged brake, and a handle operatively engaged to the brake and normally biased to a neutral position in which the brake is engaged, but which, when pulled to move the caddy, disengages the brake.

6 Claims, 6 Drawing Sheets

SHOPPING CART CADDY

FIELD OF THE INVENTION

This invention relates to a shopping cart caddy, and in particular to a caddy for transporting a row of nested shopping carts.

BACKGROUND AND SUMMARY OF THE INVENTION

Shopping carts are used in variety of retail stores to help customers carrying their purchases within the store and transport them to the parking lot. These carts must be continually collected and returned to the store, otherwise the carts are at risk of being stolen and they pose a risk of damage to the vehicles in the parking lot. Moreover, unless the carts are frequently collected, the store needs to invest in a large number of carts to meet customer needs. However, collecting and returning the carts to the store is labor intensive and expensive. The carts are frequently nested and transported in a long row, and it takes several employees to collect and transport the carts in such a row. Even when there are several employees involved in the collection of the carts there is a risk that the some of the carts will get loose and cause damage or injury.

Several attempts have been made to make the task of collecting and transporting shopping carts easier. For example Weill, European Patent No. 0 203 834 discloses a device for holding a row of nested carts together. While this prevents carts from escaping from the row, it could be difficult to transport a row of carts so rigidly secured. Coleman, PCT Application No. PCT/AU90/00140 and Fisher. U.S. Pat. No. 5,082,074 disclose motorized vehicles for conveying shopping carts that engage a row of carts from behind and push them.

These devices are elaborate and expensive, and since the row of carts is being pushed from behind, they require some skill to remotely operate the device.

SUMMARY OF THE INVENTION

The shopping cart caddy of the present invention, is of simple and relatively inexpensive construction. It securely engages a row of nested shopping carts, to prevent escape of the carts, but allows some relatively movement so allow the row to be more easily guided during transport. The caddy prevents the carts from rolling until the operator releases the brake, and operates by pulling the carts, rather than pushing, to give the operator superior control over the movement of the carts.

Generally, the shopping cart of the present invention is wheeled, and comprises a cage for receiving the front end of the first shopping cart in the row. A tether extends from the caddy and is adapted to be attached to the last cart in the row to secure the carts together. The caddy also includes a normally engaged brake, which prevents the caddy and the carts secured thereto from moving without an operator. A pivotable handle is operatively engaged to the brake and normally biased to a neutral position in which the brake is engaged. However, when the handle is pulled from its neutral position to move the caddy, the handle disengages the brake. Releasing the handle causes the handle to return to its neutral position, reengaging the brake.

In the preferred embodiment, at least some of the wheels on the caddy are pivotally mounted and the handle is connected to these wheels so that the handle can turn the wheels to facilitate guiding the caddy and the row of carts secured 30 thereto. The handle of the caddy is pulled to release the brake and pull the row of carts. Pulling the carts gives the operator greater control over the movement of the carts. If the operator lets go of the handle for any reason, the handle returns to its neutral position, which allows the brake to engage, halting further movement of the caddy and the carts.

These and other features and advantages will be in part apparent, and in part pointed out hereinafter.

BRIEF DESCRIPTION OF THE DRAWINGS

Corresponding reference numerals indicate corresponding parts throughout the several views of the drawings.

DETAILED DESCRIPTION OF THE PREFERRED EMBODIMENTS

Figures 1, 2:
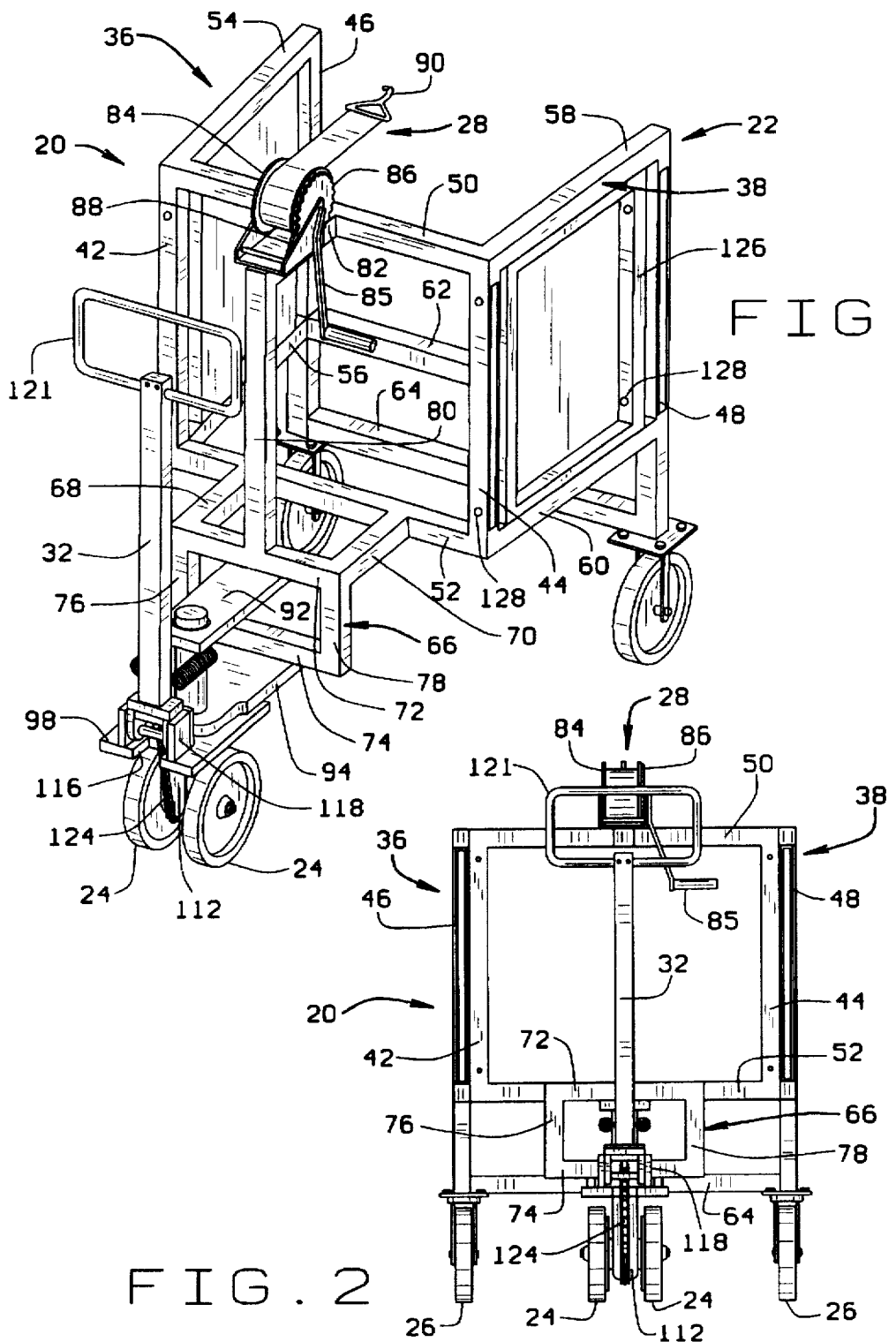
FIG. 1 is a perspective view of a shopping cart caddy constructed according to the principles of this invention.
FIG. 2 is a front elevation view of the shopping cart caddy.
Figure 3:
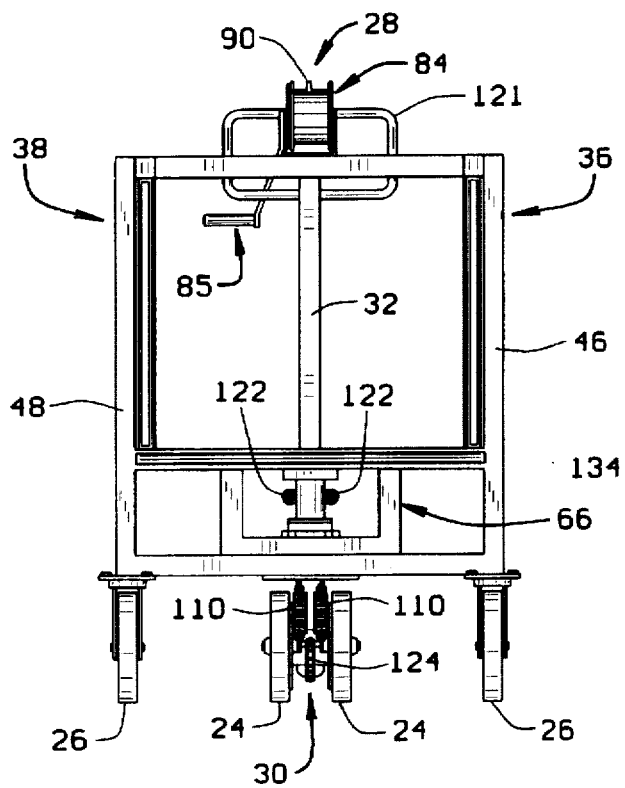
FIG. 3 is a rear elevation view of the shopping cart caddy.
Figure 4:
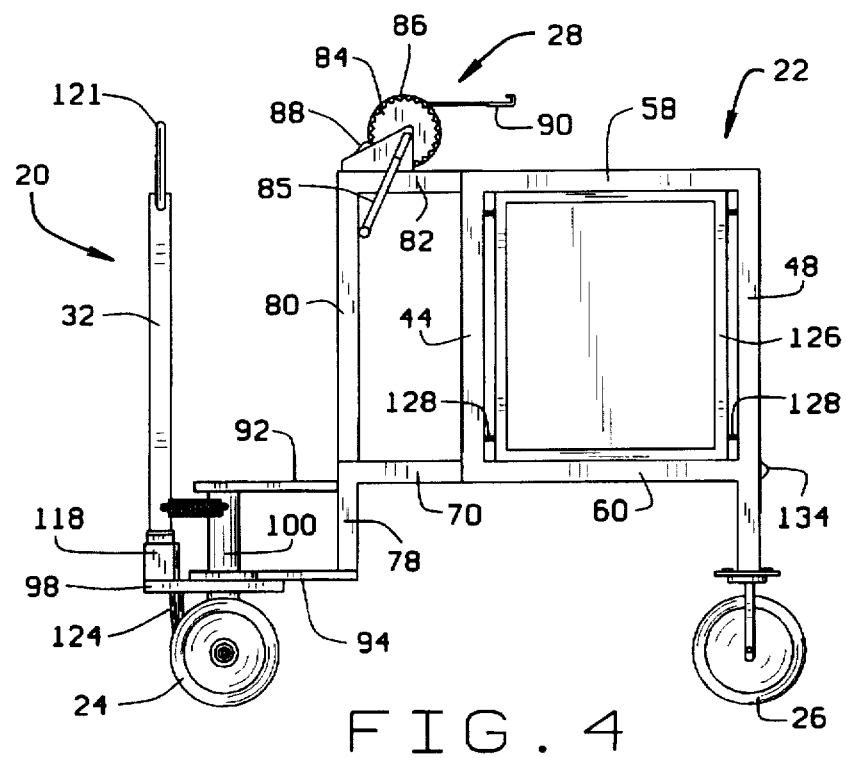
FIG. 4 is a right side elevation view of the shopping cart caddy.
Figure 5:
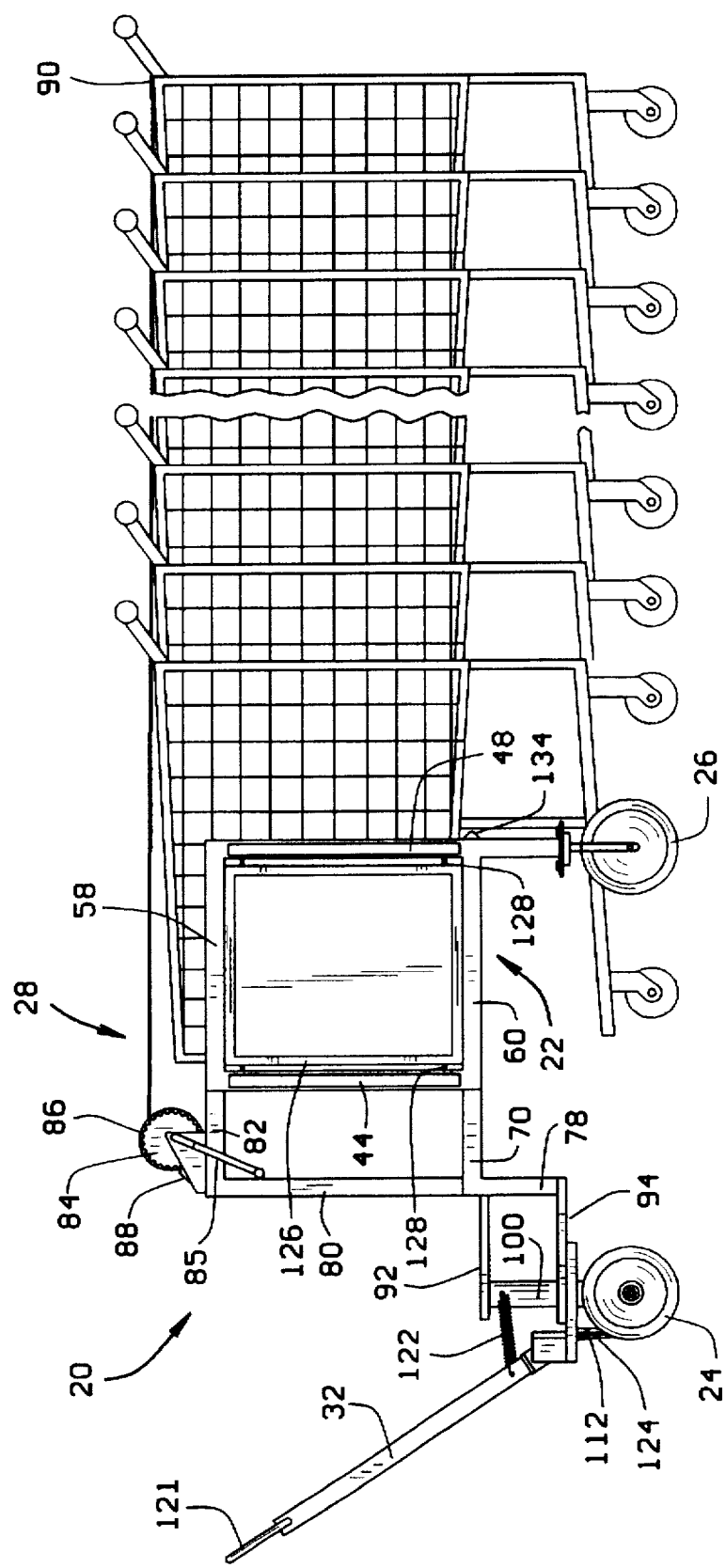
FIG. 5 is a right side elevation view of the shopping cart caddy with a row of nested shopping carts secured therein.
Figure 6:
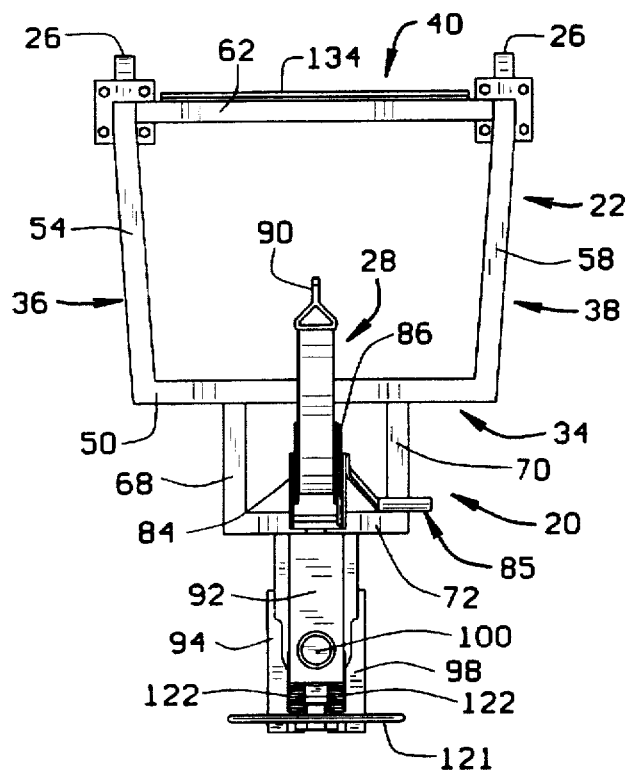
FIG. 6 is top plan view of the shopping cart caddy.
Figure 7:
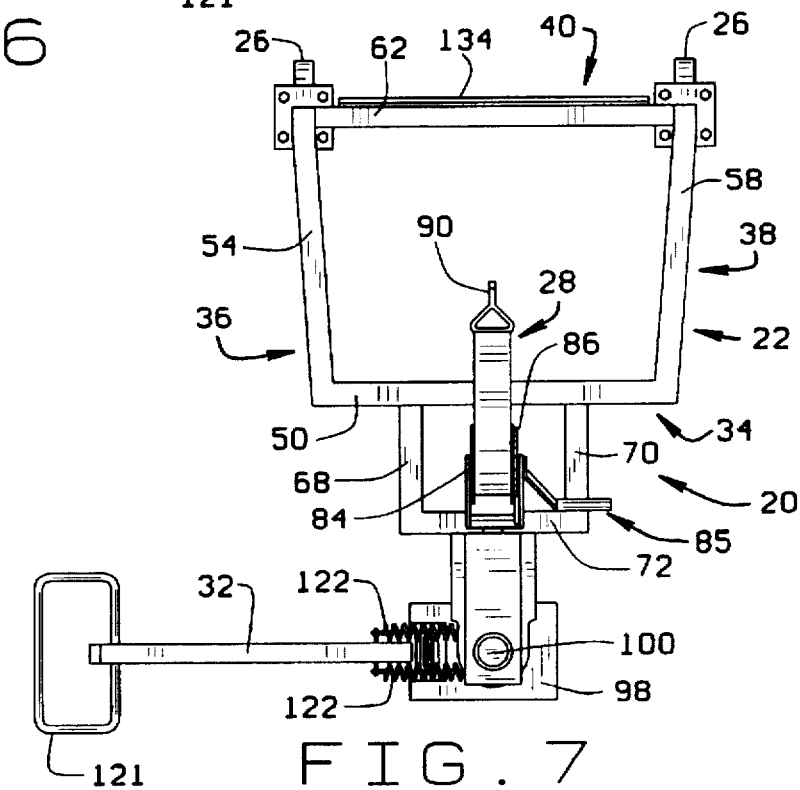
FIG. 7 is a top plan view of the shopping cart caddy with the handled pulled from its operative position and turned.

A shopping cart caddy constructed according to the principles of this invention is indicated generally as 20 in FIGS. 1-7. The shopping cart caddy 20 has cage 22 for receiving the front end of the first cart in a row of nested shopping carts, with front wheels 24 and rear wheels 26. The caddy 20 has a tether 28 for engaging the last cart in the row of nested shopping carts. The caddy also includes a brake 30 that is normally engaged. A handle 32 is mounted on the front of the cart and is operatively engaged to the brake 30. The handle 32 is normally biased to a neutral position in which the brake 30 is engaged, but when the handle 32 is pushed or pulled to move the caddy, the brake 30 is disengaged. When the handle 32 is released, it returns to its neutral position, allowing the brake 30 to engage, and stop further movement of the caddy and the row of carts secured thereto.

In this preferred embodiment the cage 22 comprises a front 34, left and right sides 36 and 38, and a back 40. The cage 22 is preferably constructed of square steel tubing, and comprises left and right front vertical posts 42 and 44 and left and right rear vertical posts 46 and 48. The front 34 is formed by upper and lower rails 50 and 52 extending between the left and right front vertical posts 42 and 44, the left side 36 is formed by upper and lower rails 54 and 56 extending between the left front vertical post 42 and the left rear vertical post 46. The right side 38 is formed by upper and lower rails 58 and 60 extending between the right front vertical post 44 and the right rear vertical post 48. Upper and lower rails 62 and 64 extend between the left and right rear vertical posts 46 and 48. A rear wheel 26 is mounted below the rear vertical posts 46 and 48.

A generally rectangular frame 66 is mounted in front of the cage with arms 68 and 70 extending from the lower rail 52. The rectangular frame comprises a top 72, a bottom 74, a left side 76 and a right side 78. A vertical post 80 extends vertically upwardly from the top 72 of the rectangular frame. A cross piece 82 extends between the post 80 and the upper rail 50. A winch 84 with a hand crank 85 is mounted on the cross-piece 82, for winding the tether 28, which is preferably made of a nylon webbing, or other suitable material. The winch 84 includes a ratchet 86 and pawl 88 for releasably locking the winch to secure the carts tightly. The end of the tether 28 has a hook 90 so that the tether can be wrapped around the last cart in the row and the tether hooked upon itself.

Figure 8:
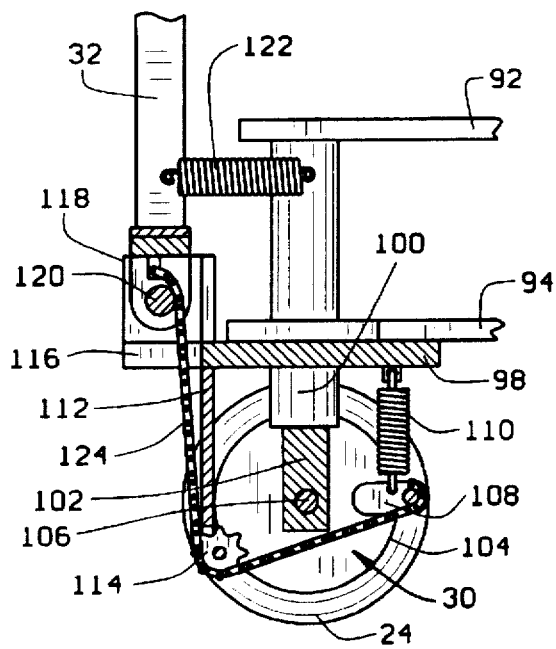
FIG. 8 is an enlarged cross sectional view of the caddy showing the front wheel with the brake in its normal, engaged position.
Figure 9:
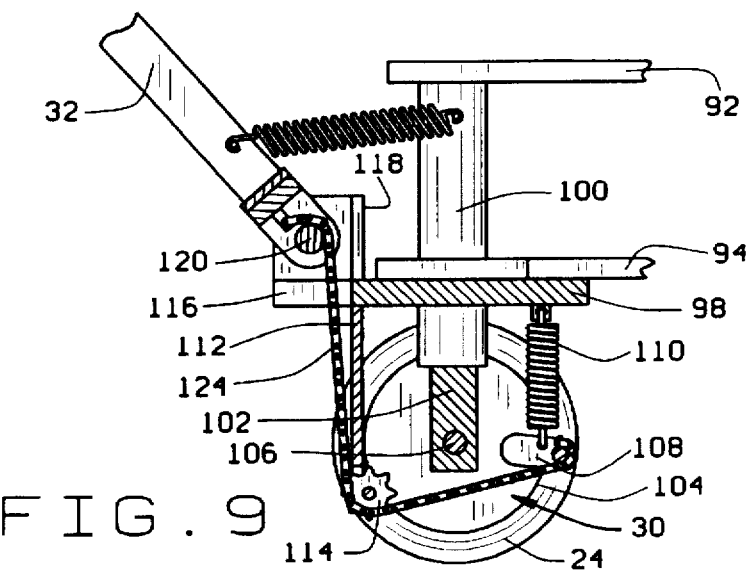
FIG. 9 is an enlarged cross sectional view of the caddy showing the front wheel with the brake in its disengaged position.

Upper and lower tongues 92 and 94 extend forwardly from the top and bottom 72 and 74, respectively, of the rectangular frame 66. A plate 98 is pivotally mounted to the upper and lower tongues 92 and 94 with a pin 100 that extends through the plate 98. A strut 102 extends below the pin 100 and mounts a normally engaged brake 104 (FIGS. 8 and 9). The brake 104 has an axle 106 extending therethrough, on which wheels 24 are mounted. The brake mechanism has an actuator arm 108 that is resiliently biased, such as with coil spring 110, to its engaged position in which the axle 106 cannot turn. A finger 112 depends from the bottom of the plate 98 in front of the strut 102, and mounts a sprocket 114.

There is notch 116 on the front end of the plate 98, and a U-shaped enclosure 118 surrounds the notch and pivotally mounts the lower end of the handle 32 with a pin 120 extending between the legs of the U-shaped enclosure. The top of the handle may be provided with a loop grip 121, if desired. The handle 32 is resiliently biased to a normal position with coil springs 122 on either side of the handle, or some other suitable device. The springs 122 are preferably secured to the pin 100 to turn with the handle 32. A chain 124 is secured to the bottom of the handle 32 and extends behind the pin 120, down around the sprocket 114, and is attached to actuator arm 108 of the brake 104. Pulling the handle 32 winds the chain 124 around the pin 122, pulling the actuator arm 108 of the brake, releasing the brake so that the axle 106, and the wheels 26 mounted thereon can turn. When the handle 32 is released the springs 122 pull the handle to its normal position, allowing the actuator arms 108 to move back to their normal position, thereby engaging the brake 104.

Figure 10:
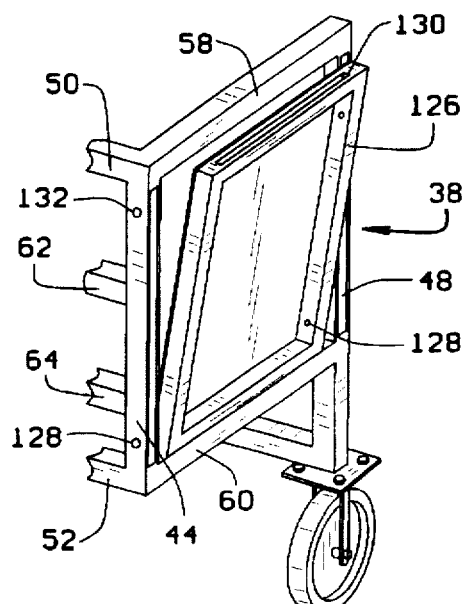
FIG. 10 is a partial perspective view of the side of the caddy, showing the optional mounting of signage.

The caddy 20 is adapted to carry signage. Each of the sides 36 and 38 can pivotally mount a frame 126 about pins 128 to swing out about a generally horizontal axis. The top of the frame 126 has a slot 130 to insert and remove a sign from the frame. The frame is swung back into its normal vertical position inside the side, and secured with fasteners, such spring-loaded pins (FIG. 10) 132. A bumper strip 134 can be provided on the upper rail 62 on the back of the cage to protect the cart whose front end is inserted in the cage. Reflectors 136 can be provided on the posts 44, 44, 46 and 48.

Figure 11:
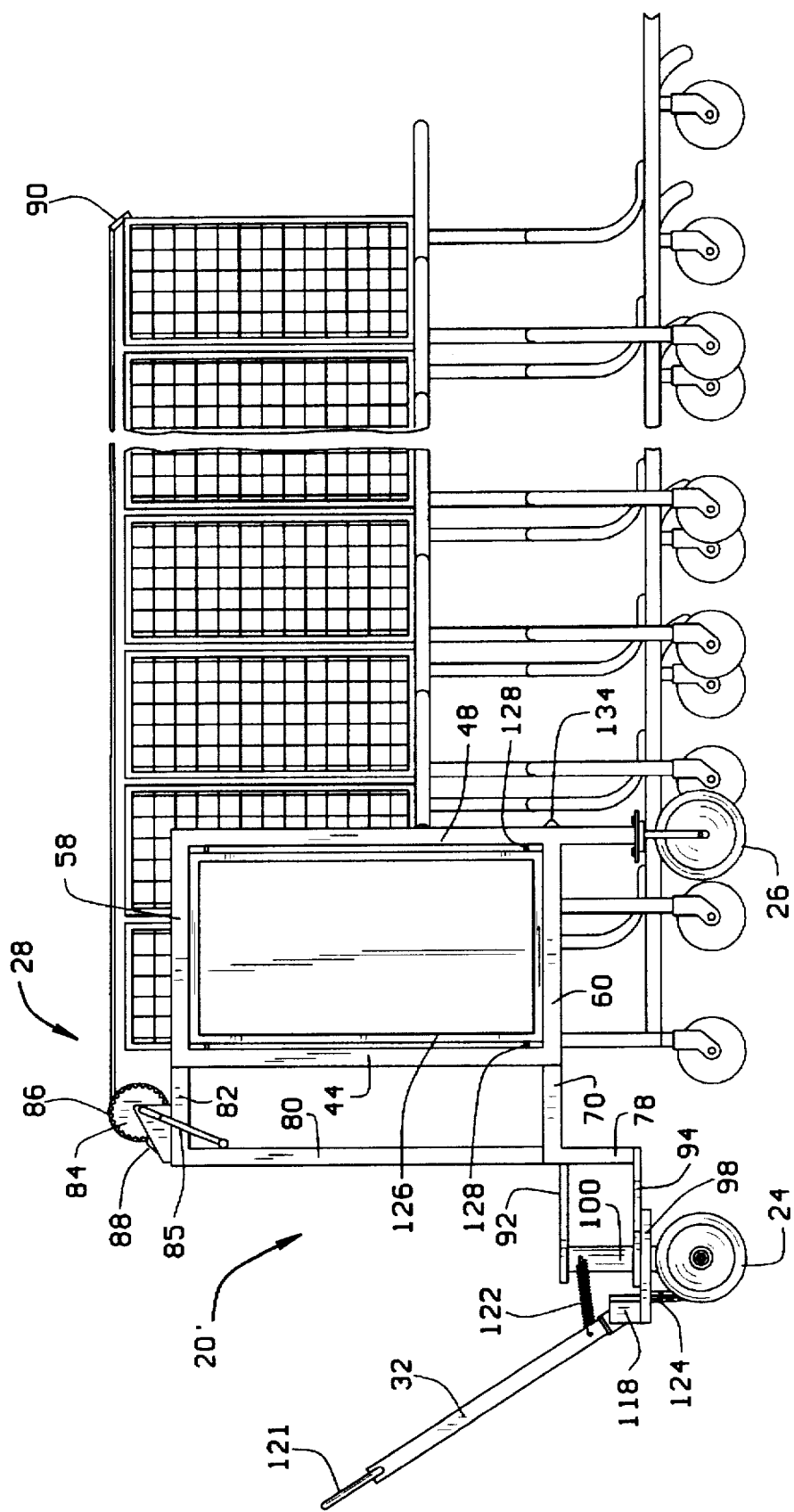
FIG. 11 is a side elevation view of a second embodiment of a caddy constructed according to the principles of this invention.

A second embodiment of a shopping cart caddy constructed according to the principles of this invention is indicated generally as 20' in FIG. 11. Caddy 20' is similar in construction to caddy 20, and corresponding parts are identified with corresponding reference numerals. However, caddy 20' is adapted for use with another type of shopping cart used in some stores. The caddy is higher to accommodate the greater height of the folded, nested carts.

OPERATION

In operation, a row of nested carts is loaded into the caddy 20. The cage 22 receives the front end of the first cart in the row. The basket of the first cart passes into the open back of the cage 22, over the upper and lower rails 62 and 64, while the wheeled base of the cart passes under the upper and lower rails. The pawl 88 is disengaged from the ratchet 86, and the tether 28 unwound from the winch 84 sufficiently to allow it to be wrapped around the last cart in the row and hooked on itself with hook 90. The winch 94 is then operated with crank 95 to tighten the tether 28 to hold the row of carts together.

Once the row of carts is properly secured in the caddy 20, the handle 32 is pulled, which releases the brake 30 and allows the caddy and the row of carts to be pulled. The front wheels of the caddy 20 pivot with the handle 32, so that the caddy is very maneuverable, following the direction in which the handle is pulled, and can easily guide the row of carts to the desired destination. In contrast to other devices for collecting carts, the caddy 20 allows the operator to pull the carts from the front of the line, providing greater control over the line of carts, allowing the operator to steer the carts within the close confines of a store or store parking lot. The caddy 20 is quickly and easily disengaged from the carts by loosening the tether 28, disengaging it from the carts and then simply pulling the caddy from the first cart in the row.

What is claimed is:

1. A wheeled caddy for transporting a row of nested shopping carts, the caddy comprising a cage for receiving the front end of the first shopping cart in the row, a tether extending from the caddy and adapted to be attached to the last cart in the row; a normally engaged brake; a handle operatively engaged to the brake and normally biased to a neutral position in which the brake is engaged, but which, when pushed or pulled to move the caddy, disengages the brake.

2. The wheeled caddy according to claim 1 wherein the caddy has at least one pivotally mounted wheel, and wherein the handle is connected to the wheel to pivot the wheel.

3. The wheeled caddy according to claim 2 wherein the caddy has a pair of pivotally mounted front wheels, and wherein the handle is connected to the front wheels to pivot the wheels.

4. The wheeled caddy according to claim 1 further comprising a winch for winding the tether.

5. The wheeled caddy according to claim 1 where the cage comprises a front, and left and right sides.

6. The wheeled caddy according to claim 5 wherein the caddy is adapted for use with shopping carts of the type having a wheeled base, and a basket portion spaced above the base, and wherein the cage comprises at least one back member positioned so that the basket portion of the cart can pass over it and the wheeled base can pass under it.

* * * * *